United States Patent [19]

Williams et al.

[11] 4,083,423

[45] Apr. 11, 1978

[54] VEHICLE ROAD SPEED SIGNAL SOURCE

[75] Inventors: James A. Williams, Richmond; Larry O. Gray, Greensfork, both of Ind.

[73] Assignee: Dana Corporation, Toledo, Ohio

[21] Appl. No.: 592,373

[22] Filed: Jul. 2, 1975

[51] Int. Cl.² ................................................ G01P 3/42
[52] U.S. Cl. ................................ 180/105 E; 73/519; 324/174; 361/240
[58] Field of Search ............ 303/95, 96, 97, 103; 180/105 E; 324/166, 173, 174; 73/518, 519; 104/152; 246/34 R, 247, 249; 307/233 R; 317/5; 328/140, 141; 361/236, 240; 340/195, 263; 310/68 R

[56] References Cited

U.S. PATENT DOCUMENTS

| | | | |
|---|---|---|---|
| 2,719,912 | 10/1955 | Maenpaa | 361/240 |
| 3,274,443 | 9/1966 | Eggenberger | 317/5 |
| 3,622,208 | 11/1971 | Krugler | 317/5 |
| 3,664,711 | 5/1972 | Berry | 317/5 |
| 3,805,161 | 4/1974 | Bayha | 73/519 |
| 3,868,570 | 2/1975 | Kopera | 324/174 |
| 3,898,563 | 8/1975 | Erisman | 324/174 |

FOREIGN PATENT DOCUMENTS 2,322,032  11/1973  Germany ................. 307/233 R

*Primary Examiner*—Trygve M. Blix
*Assistant Examiner*—Reinhard J. Eisenzopf
*Attorney, Agent, or Firm*—William J. Clemens

[57] ABSTRACT

A vehicle road speed signal source including a speed sensor and a frequency to voltage converter for generating a pulsed output signal having an average magnitude proportional to the road speed of an associated vehicle. The speed sensor has a high energy product magnet attached to the drive shaft of the vehicle which induces current pulses in approximately spaced pick-up coil. The pick-up coil is connected to a preamplifier having a low input impedance to reduce the effect of spurious signals such as ignition noise. The preamplifier output signal may be shaped into a square wave pulse train or may be applied directly to the frequency to voltage converter which generates a pulsed output signal having a duty cycle and therefore an average magnitude proportional to the vehicle road speed.

9 Claims, 9 Drawing Figures

VEHICLE ROAD SPEED SIGNAL SOURCE

CROSS-REFERENCE TO RELATED APPLICATION

The present invention may be utilized to generate a vehicle road speed which is an input to the speed control circuit disclosed in the co-pending U.S. patent application entitled "VEHICLE SPEED CONTROL CIRCUIT", Ser. No. 580,063, filed May 22, 1975, and assigned to the assignee of the present application. This application issued as U.S. Pat. No. 3,952,829 on Apr. 27, 1976.

BACKGROUND OF THE INVENTION

1. Field of the Invention

This invention relates in general to an apparatus for generating a speed proportional signal and relates in particular to an apparatus for generating a pulsed output signal having an average magnitude proportional to the road speed of a vehicle.

2. Description of the Prior Art

In recent years, the factors of safety, environmental concern and convenience have created a demand for vehicle speed control devices. For example, in an automobile, the driver's attention must be divided between watching the traffic and road and watching the speedometer so that he can maintain a chosen speed. In addition, on a long trip it becomes quite tiring to manually control the accelerator pedal since the driver's right foot and leg must remain in relatively the same position. When a speed control apparatus is utilized, the driver is free to be constantly alert to the traffic and road conditions and will arrive at his destination in a less tired condition. Furthermore, the maintenance of a constant speed tends to increase gas mileage and decrease automobile emissions which are important environmental goals.

Today, many trucks incude power take-off units for driving auxiliary equipment. Often it is desirable to maintain a uniform operating speed under varying load conditions imposed on the truck engine by the auxiliary equipment. Normally, this requires an operator who must control the accelerator pedal in response to the engine speed as read from a tachometer. This is a tiring and difficult job and often one or more other workers must be utilized to monitor and/or operate the auxiliary equipment. Therefore, a speed control apparatus may be utilized to advantage to control the engine at a uniform speed. Such operation tends to reduce fuel consumption and engine emissions and may allow a reduction in the number of workers required.

The speed control apparatus requires as an input a signal representing the actual speed value which is to be controlled. In previous speed control systems, it has been common practice to derive the actual speed signal from the speedometer cable. This is not a difficult task when the vehicle is being constructed since the required connection to some form of actual speed signal generating means may be provided. However, it is much more difficult to add a speed control apparatus to an existing vehicle. The speedometer cable must be replaced by a speedometer cable modified to drive a speed signal source. This requires the production of a great many speedometer cables for use with the various models of cars on the road today. Such an approach, therefore, is costly from the standpoint of the large inventory required and the large amount of time required to replace the speedometer cables.

SUMMARY OF THE INVENTION

The present invention relates to an apparatus for generating a pulsed output signal which has an average magnitude proportional to the detected road speed of a vehicle. A high energy product permanent magnet is attached to a member of the vehicle, such as the drive shaft, which is rotating at a rate proportional to the vehicle road speed. The rotating magnet induces a current pulse in a proximately spaced pick-up coil each time the magnet rotates past the coil. The current pulses are amplified by a preamplified having a low input impedance. In one embodiment, the preamplifier also shapes the current pulses into a square wave pulse train. The preamplifier output signal is then applied to the frequency to voltage converter which generates a pulsed output signal having a duty cycle proportional to the vehicle road speed. The pulsed output signal may be utilized as the vehicle road speed input signal to a vehicle speed control system such as the system disclosed in co-pending U.S. patent application Ser. No. 580,063, filed May 22, 1975, and assigned to the same assignee as the present invention. This application issued as U.S. Pat. No. 3,952,829 on Apr. 27, 1976.

It is an object of the present invention to provide an economical yet accurate apparatus for generating a pulsed output signal having an average magnitude proportional to the road speed of a vehicle to which it is attached.

It is a further object of the present invention to provide a road speed signal source which may be easily installed on any model car.

It is another object of the present invention to provide a road speed signal source having a relatively high degree of spurious noise rejection for increased speed control accuracy.

DESCRIPTION OF THE PREFERRED EMBODIMENT

Figure 1:
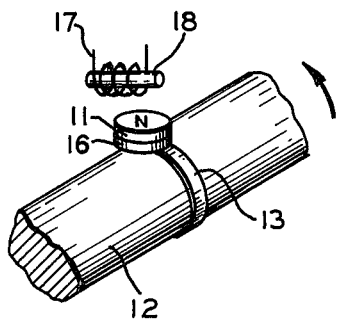
FIG. 1 is a fragmentary perspective view of the pulse generating magnet and pick-up coil of the present invention.
Figure 2:
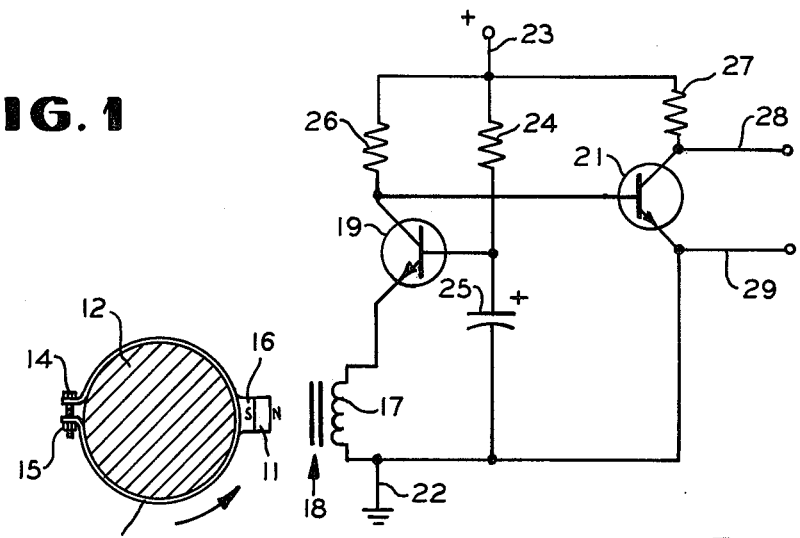
FIG. 2 is a partial side elevational view and a partial schematic diagram of the pulse generating magnet and pick-up coil of FIG. 1 and the pulse shaping and amplification circuit of the present invention.

Referring to FIGS. 1 and 2 there is shown the pulse generating magnet and pick-up coil and pulse shaping and amplification circuit of a speed sensor according to the present invention. A disc shaped permanent magnet 11 is attached to a rotating member of the vehicle which rotates at a speed proportional to the road speed of the vehicle. Typically, this member is a drive shaft 12 wherein the magnet is attached by any suitable means such as a band 13 which partially encircles the drive shaft. The ends of the band 13 are turned outwardly from the drive shaft 12 and are substantially parallel to each other. Each end has an aperture formed therein for receiving a cap screw 14 which has a nut 15 threaded onto the end thereof. The cap screw 14 and the nut 15 co-operate to force the ends of the band 13 toward one another thereby drawing the band 13 into gripping engagement with the exterior surface of the drive shaft 12. The magnet 11 is fixedly attached to a mounting pedestal 16 formed on the band 13 opposite the ends thereof such that the magnet 11 rotates with the drive shaft 12.

A pick-up coil 17, wound on a ferromagnetic core 18, is positioned proximate the rotational path of travel of magnet 11. If the magnet 11 is magnetized along the longitudinal axis of the disc, it will generate a magnetic field having lines of magnetic induction which leave the north pole, designated by the letter "N", and enter the south pole, designated by the letter "S". As the drive shaft 12 rotates, the magnetic field will be rotated past the pick-up coil 17 which cuts the lines of magnetic induction thereby inducing a current pulse in the coil 17 once each rotation of the drive shaft. The current pulses are in the form of a single cycle of an alternating current signal shown as the waveform A of FIG. 4. These current pulses are shaped and amplified by a pair of NPN transistors 19 and 21 to generate a square wave output signal having a frequency proportional to the road speed of the vehicle.

The transistor 19 is connected in a common base configuration to function as a low input impedance preamplifier for the current pulses. The coil 17 is connected between an emitter of the transistor 19 and a line 22 connected to the circuit ground. A positive polarity direct current power source (not shown) is connected between a power input line 23 and the ground line 22 to supply electrical power to the circuit. The transistor 19 is supplied with base current from the power supply through a resistor 24 connected between the input line 23 and a junction of a base of the transistor 19 and a lead of a capacitor 25. The other lead of the capacitor 25 is connected to the ground line 22.

The capacitor 25 receives a charging current through the resistor 24 to maintain a biasing voltage at the base of the transistor 19 to turn it on. The turned on transistor 19 permits current to flow from the power supply (not shown) into the power input line 23, through a resistor 26 connected between the input line 23 and a collector of the transistor 19, through the transistor 19, through the coil 17, out of the ground line 22 and back to the power supply (not shown). If the transistor 19 is biased so as to drive it into saturation and the resistance of the resistor 26 is relatively large as compared with the collector-emitter resistance and the resistance of the coil 17, then the voltage at the collector of the transistor 19 will be near the circuit ground potential.

The transistor 21 is connected in a common emitter configuration to function as a wave shaper to generate a square wave pulse train signal. The base of the transistor 21 is connected to the collector of the transistor 19 to obtain a base biasing voltage. A collector of the transistor 21 is connected to the power supply line 23 through a resistor 27 while an emitter of the transistor 21 is connected to the ground line 22. When the transistor 19 is turned on, the base of the transistor 21 will be biased near the circuit ground potential to turn off the transistor 21. Therefore, no current will flow through the transistor 21 and the resistor 27 and the collector of the transistor 21 will be at the power supply voltage level. The output voltage measured between a pair of output lines 28 and 29, connected to the collector and emitter respectively of the transistor 21, will be equal to the power supply voltage.

Figure 4:
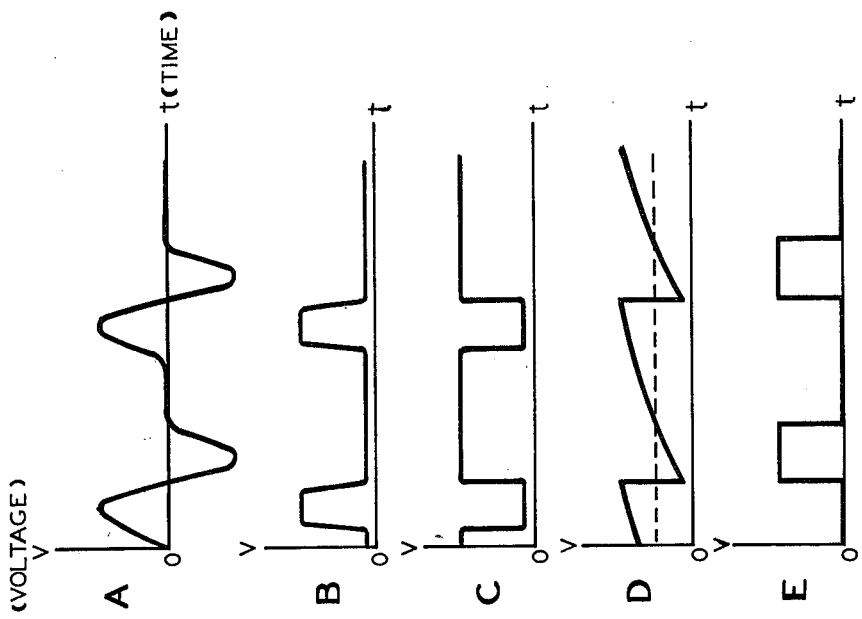
FIG. 4 is a waveform diagram of the various waveforms generated in the circuits of FIGS. 2 and 3.

The relationship between the direction of the winding of the coil 17 and the magnetic polarity of the outer face of the magnet 11 will determine the order of the positive and negative half cycles of the waveform A of FIG. 4 and therefore the timing of the other waveforms generated therefrom. During the positive half cycle, the direction of the flow of the induced current is opposite the direction of flow of the current through the transistor 19 when it is turned on and the magnitudes of the currents are approximately equal to turn off the transistor 19. The voltage at the collector of the transistor 19 then increases toward the power supply voltage and is applied at the base of the transistor 21 to turn it on. The output signal at the collector of the transistor 19 is shown as the waveform B of FIG. 4. When the transistor 21 turns on, current will flow from the power supply (not shown), into the input line 23, through the resistor 27, through the transistor 21, out of the ground line 22 and back to the power supply (not shown). If the transistor 21 is biased so as to drive it into saturation and the resistance of the resistor 27 is relatively large as compared with the collector-emitter resistance, then the voltage at the collector of the transistor 21 will be near the circuit ground potential.

The output signal from the circuit of FIG. 2, on the output lines 28 and 29 as measured with reference to the line 29, will appear as a constant voltage having the magnitude of the power supply voltage interrupted by relatively sharply defined pulses having a voltage magnitude near the circuit ground potential. One of these pulses will appear each time the magnet 11 rotates past the coil 17 so that the rate of generation of the pulses represents the rotational velocity of the drive shaft which is proportional to the road speed of the vehicle. The output signal is shown as the waveform C of FIG. 4.

Since the magnet 11 rotates with the drive shaft 12, it must be of a mass which will not unbalance the drive shaft. The magnet 11 is also required to have a relatively strong magnetic field intensity so that the coil 17 can be positioned far enough away from the drive shaft 12 so as not to interfere with any movement of the drive train, yet provide a reliable current pulse for each revolution. The product of the magnetizing force in oersteds and the magnetic field intensity in gauss is called the energy product and is a measure of the field intensity-size ratio of a magnetic material. Until now there has not been available a permanent magnet material with a high enough energy product to satisfy these requirements. Recently, a magnetic material made from a rare earth alloy was placed on the market by Hitachi Magnetics. This material is made from a samarium-cobalt alloy which has a much higher energy product than previously known permanent magnet materials and has been given the trade name "HICOREX". A relatively small disc made from this material has been found to induce current pulses of sufficient magnitude in a coil spaced approximately two to five inches (5.1 to 12.7 cm) from the path of rotation of the magnet. Satisfactory results have been achieved with a magnet 11 having a diameter of 0.25 inches (6.4 mm) and a thickness of 0.1 inch (2.5 mm) and a coil 17 which may be formed with fifteen hundred turns of number thirty-three copper wire. MPS 3704 transistors manufactured by Motorola, Inc. of Phoenix, Ariz. were utilized for the transistor 19 and 21, the capacitor 25 had a value of one hundred microfarads, the power supply had a potential of 8 volts and the resistors 24, 26 and 27 had values of two hundred thousand ohms, ten thousand ohms and forty-seven thousand ohms respectively. The circuit of FIG. 2, having the above-identified components, will generate a square wave pulse train which alternates between positive eight volts and positive one half volt on the output line 28 with respect to the output line 29 with no load connected.

Figure 3:
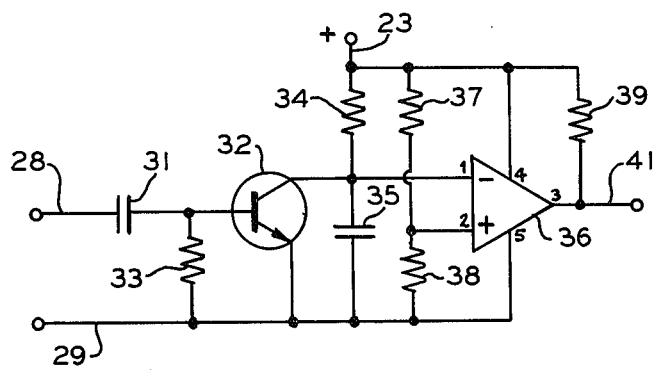
FIG. 3 is a schematic diagram of the frequency to voltage converter of the present invention.

The output signal from the speed sensor circuit of FIG. 2 is applied to the frequency to voltage converter of FIG. 3. The output line 28 is connected to one lead of a capacitor 31 and the output lead 29 provides a return path to ground through the ground line 22 of FIG. 2. The other lead of the capacitor 31 is connected to the junction of a base of a NPN transistor 32 and a resistor 33 which is connected between the base and the output line 29. An emitter of the transistor 32 is connected to the output line 29 and a collector is connected to the power input line 23 through a resistor 34. A capacitor 35 is connected between the output line 29 and the junction of the collector and the resistor 34.

When the speed sensor of FIG. 2 is not generating output pulses, the capacitor 31 will charge to the power supply potential through the resistor 27 of FIG. 2 and the resistor 33 to place the base of the transistor 32 at ground potential and turn the transistor off. If output pulses are generated, the leading edge of the ground potential output pulse on the output line 29 is applied to the capacitor 31. Since the voltage across a capacitor cannot change instantaneously, the voltage at the base of the transistor 32 will be driven negative to hold the transistor in the turned off state. The capacitor 31 will discharge through the resistor 33.

When the trailing edge of the ground potential pulse occurs, the power supply potential will be applied to the capacitor 31. Again, since the voltage across a capacitor cannot change instantaneously, the voltage at the base of the transistor will be driven toward the power supply potential to fully turn on the transistor 32. The capacitor 35 will rapidly discharge through the turned on transistor to the collector-emitter saturation voltage potential. The capacitor 31 will charge through the resistors 27 and 33 to drive the base voltage to the ground potential to turn off the transistor 32. Now the capacitor 35 will charge through the resistor 34 toward the power supply potential. The output signal at the collector of the transistor 32 is shown as the waveform D of FIG. 4 with the slope of the charging portion determined by the values of the resistor 34 and the capacitor 35.

The collector of the transistor 32 is connected to an inverting input 36-1 of a high gain operational amplifier which functions as a voltage comparator to generate an output signal having an average magnitude proportional to the vehicle road speed. The amplifier 36 is supplied with operating power from the power input line 23 connected to a terminal 36-4. The amplifier 36 responds to the difference between the signals applied to the input 36-1 and a non-inverting input 36-2 to generate an output signal at an output 36-3 proportional to that difference limited to a maximum near the potential connected to the output 36-3 and to a minimum near the potential connected to a terminal 36-5. Since the output 36-3 is connected to the power input line 23 and the terminal 36-5 is connected to the ground line 22, the output signal of the amplifier 36 will be limited between the power supply potential and the ground potential.

A resistor 37 is connected between the power input line 23 and the input 36-2 and a resistor 38 is connected between the input 36-2 and the output line 29. The resistors 37 and 38 function as a voltage divider to apply some portion of the power supply potential, typically one half, to the input 36-2 as a reference voltage. The reference voltage is shown as a dashed line on the waveform D of FIG. 4. The magnitudes of the input signals are such that the amplifier 36 will generate its maximum potential when the signal applied to the input 36-1 is less than the reference voltage and will generate its minimum potential when the signal applied to the input 36-1 is greater than the reference voltage.

If the capacitor 35 is discharged to the collector-emitter saturation voltage of the transistor 32, the voltage on the capacitor will always recross the reference voltage after the same amount of time to generate a constant width square wave pulse train at the output 36-3 shown as waveform E of FIG. 4. Since the frequency is proportional to the vehicle road speed, the average magnitude of the pulse train will also be proportional to the vehicle road speed. A resistor 39 is connected between the power input line 23 and an output line 41 connected to the output 36-3 to supply current to a load connected to the output line 41 since the amplifier output 36-3 is connected to an open collector of an internal output transistor (not shown).

In summary, the speed sensor of FIG. 2 and the frequency to voltage converter of FIG. 3 sense the speed of a vehicle and generate a pulsed output signal having an average magnitude proportional to the vehicle road speed. The speed sensor includes a relatively high energy product permanent magnet attached to the drive shaft of the vehicle to induce current pulses in a proximately spaced pick-up coil. The current pulses are amplified by a preamplifier having a low input impedance to reduce the effect of spurious signals such as ignition noise. The current pulses are shaped into a square wave pulse train and are applied to the input of the frequency to voltage converter. The converter includes an operational amplifier which compares the pulse train to a reference voltage to generate constant width square wave pulses as the vehicle road speed output signal.

Figure 5:
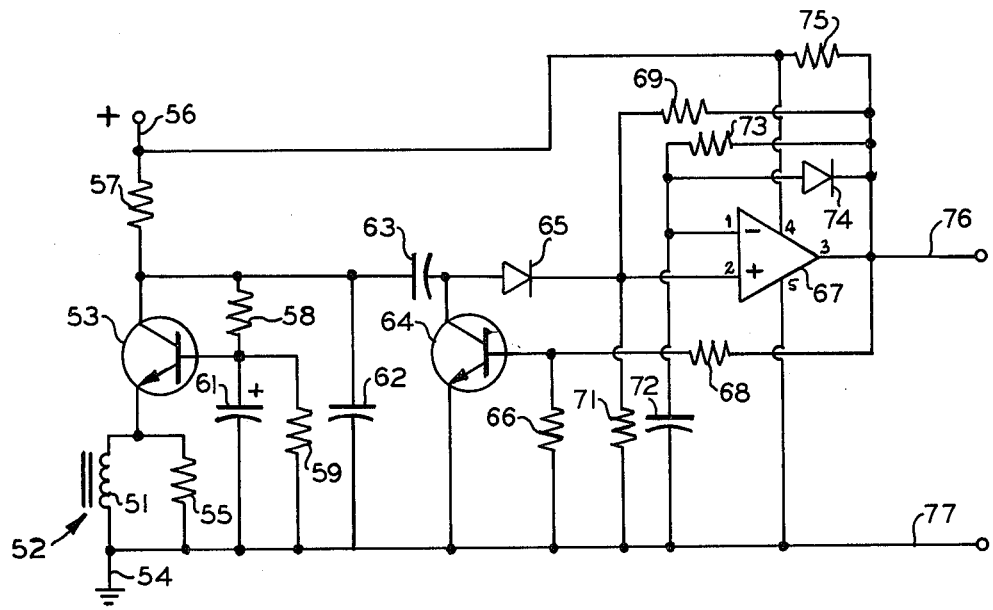
FIG. 5 is a schematic diagram of an alternate embodiment of the signal source according to the present invention.

Referring to FIG. 5, there is shown an alternate embodiment of the vehicle road speed signal source according to the present invention. A pick-up coil 51 is wound on a magnetic core 52 and is positioned proximate the rotational path of travel of a magnet (now shown) similar to the magnet 11 of FIGS. 1 and 2. A NPN transistor 53 is connected in a common base configuration to function as a low input impedance preamplifier for the current pulses induced in the coil 51. These current pulses are in the form of a single cycle of an alternating current signal shown as waveform A of FIG. 6.

The coil 51 is connected between an emitter of the transistor 53 and a line 54 connected to the circuit ground. A resistor 55 is connected in parallel with the coil 51. A positive polarity direct current power source (not shown) is connected between a power input line 56 and the ground line 54 to supply electrical power to the circuit. The transistor 53 has a collector connected to the power input line 56 through a resistor 57 and to a base through a resistor 58. The base is connected to the ground line 54 through the parallel connection of a resistor 59 and a capacitor 61. The collector is connected to the ground line 54 through a capacitor 62.

The preamplifier transistor 53 amplifies and half wave rectifies the current pulses from the coil 51. The resistor 58 and 59 function as a voltage divider to bias the transistor 53 near cutoff. Therefore, the voltage at the collector will be near the power supply potential. When the positive half cycle of the current pulse occurs, the transistor will be driven into cutoff. When the negative half cycle of the current pulse occurs, the emitter voltage will be drawn negative to drive the transistor toward saturation causing the collector voltage to fall. The output signal at the collector is shown as the waveform B of FIG. 6 with reduced voltage output pulses corresponding to the negative half cycles of the waveform A.

The capacitor 61 bypasses the base of the transistor 53 for all frequencies in the range of the current pulse frequencies to allow a relatively large amount of d.c. feedback and a relatively small amount of a.c. feedback. Thus the transistor has high stability with maximum a.c. gain. The capacitor 62 bypasses the collector to reduce the gain for frequencies above the current pulse range such as the frequencies for ignition noise. The resistor 57 limits the current flow through the transistor 53 and the resistor 55 provides a current flow path for the positive half cycle of the current pulse.

The collector of the transistor 53 is connected to one lead of a capacitor 63 in the frequency to voltage converter. The other lead of the capacitor 63 is connected to the junction of a collector of a NPN transistor 64 and an anode of a diode 65. The transistor 64 has an emitter connected to the ground line 54 and a base connected to the ground line 54 through a resistor 66. A cathode of the diode 65 is connected to a non-inverting input of an amplifier 67. An output 67-3 of the amplifier 67 is connected to the base of the transistor 64 through a resistor 68. The output 67-3 is also connected to the non-inverting input 67-2 through a resistor 69 and the non-inverting input 67-2 is connected to the ground line 54 through a resistor 71.

The amplifier 67 also has an inverting input 67-1 which is connected to one lead of a capacitor 72. The other lead of the capacitor 72 is connected to the ground line 54. The inverting input 67-1 is also connected to the output 67-3 through a resistor 73 connected in parallel with a diode 74. The diode 74 has an anode connected to the input 67-1 and a cathode connected to the output 67-3. A resistor 75 is connected between the power input line 56 and the junction of the output 67-3 and an output line 76 to supply current to a load connected to the output line 76 and an output line 77 since the amplifier output 67-3 is connected to the open collector of an internal output transistor (not shown). The output line 77 is connected to the ground line 54.

Figure 6:
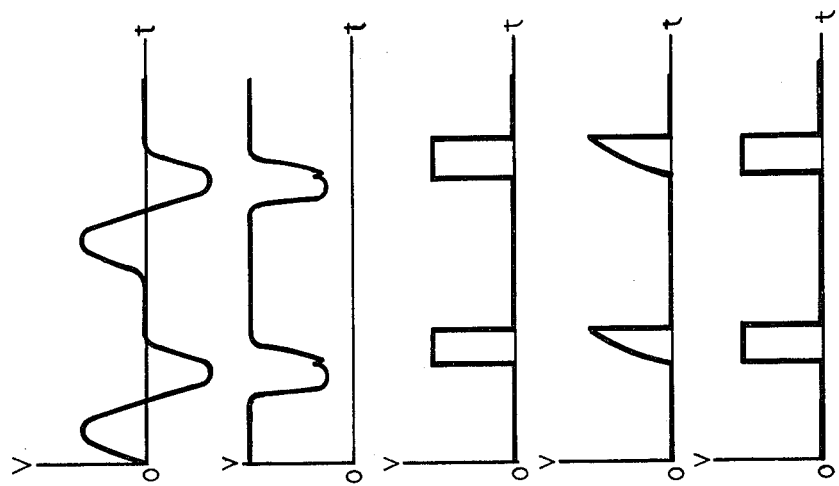
FIG. 6 is a waveform diagram of the various waveforms generated in the circuit of FIG. 5.

The amplifier 67 functions as a monostable multivibrator generating a constant width output pulse for each of the reduced voltage output pulses of the waveform B of FIG. 6. Since the frequency of the reduced voltage pulses is proportional to the vehicle road speed, the average magnitude of the output signal from the amplifier 67 will be proportional to the vehicle road speed.

The output signal at 67-3 charges the capacitor 72 through the resistor 73 and is applied to the inverting input 67-1. The resistors 69 and 71 function as a voltage divider to apply approximately one half of the output signal to the non-inverting input 67-2 as a reference voltage. Since the non-inverting input signal has a lower potential than the inverting input signal, the amplifier 67 will generate its minimum output potential, typically one half volt, and the voltage at the non-inverting input 67-2 may be designated as the minimum reference voltage.

With no signal induced in the coil 51, the capacitor 63 will charge through the resistor 57 to the power supply potential less the minimum output potential signal at the non-inverting input 67-2. When the negative half cycle of the current pulse occurs, the capacitor 63 will discharge through the turned on transistor 53 and the collector-base junction of the transistor 64. As the negative half cycle of the current pulse returns to zero voltage, the transistor 53 will be driven from saturation to cutoff the capacitor 63 will recharge to the power supply potential. Since the voltage across the capacitor 63 cannot change instantaneously, a positive voltage will be applied to the non-inverting input 67-2 through the diode 65. This voltage will quickly exceed the minimum reference voltage applied to the inverting input 67-1 to switch the amplifier output signal to its maximum potential. One half of the output signal is applied at the input 67-2 as a maximum reference voltage, as shown in waveform C of FIG. 6, to reverse bias the diode 65. At the same time, the output signal is applied to the base of the transistor 64 to drive it into saturation and clamp the junction of the capacitor 63 and the diode 65 to the ground line 54. The turning on of the transistor 64 will maintain the reverse bias on the diode 65 by diverting input current from the capacitor 63 to ground to reduce the voltage at the capacitor-diode junction. This reduction will be reflected in the waveform B as shown in FIG. 6. The capacitor 63 will continue to charge through the resistor 57 and the transistor 64 toward the power supply potential.

The capacitor 72 now begins to charge toward the maximum potential output signal through the resistor 73. The voltage across the capacitor 72 is shown as waveform D of FIG. 6. When the voltage across the capacitor 72 exceeds the maximum reference voltage at the non-inverting input 67-2, the amplifier will switch to the minimum potential output. The diode 74 provides a low resistance path to quickly discharge the capacitor 72. The minimum potential output also turns off the transistor 64. The pulsed output signal on the output lines 76 and 77 is shown as waveform E of FIG. 6. The values of the capacitor 72 and the resistor 73 determine the time required to charge the capacitor to the maximum reference voltage potential and therefore determine the width of output pulse from the amplifier 67. If this time is greater than the time required to charge the capacitor 63, the turning off of the transistor 64 will not be reflected in the signal at the collector of the transistor 53 as shown in the waveform B of FIG. 6. Now the frequency to voltage converter is ready to respond to the next reduced voltage pulse from the speed sensor.

Thus the amplifier 67 functions as a monostable multivibrator to generate output pulses on the output lines 76 and 77. These pulses are of a constant width determined by the values of the capacitor 72 and the resistor 73 and have a constant magnitude. Since the frequency of these pulses is proportional to the vehicle road speed, the average magnitude of the output signal on the lines 76 and 77 will also be proportional to the vehicle road speed.

Figure 7:
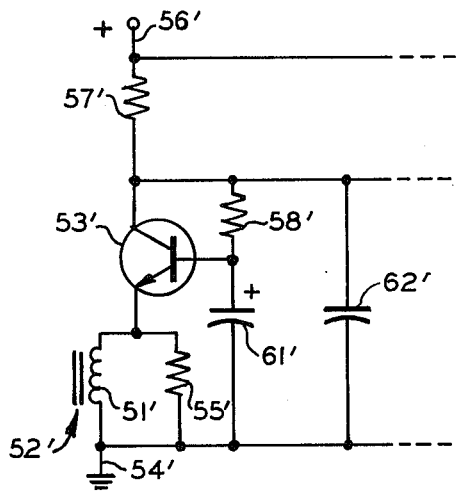
FIG. 7 is a schematic diagram of a second alternate embodiment of the signal source according to the present invention.

There is shown in FIG. 7 a second alternate embodiment according to the present invention. The circuit of FIG. 7 is similar to the circuit of FIG. 5 so that only the speed sensor portion of the circuit is shown. Reference numerals for similar elements have been primed, such as the coil 51' which is similar to the coil 51, and the resistor 59 of FIG. 5 has been eliminated.

Figure 8:
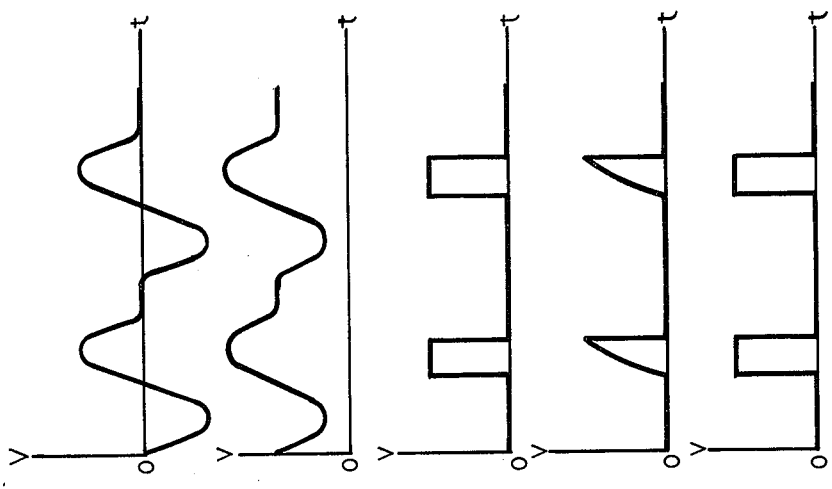
FIG. 8 is a waveform diagram of the various waveforms generated in the circuit of FIG. 7.

The current pulses which are induced in the coil 51' are shown as waveform A of FIG. 8. This waveform is the inverse of the waveforms A of FIGS. 4 and 6 and is generated by reversing either the direction of winding of the coil 51', or the polarity of the magnet (not shown) or the direction of rotation of the drive shaft (not shown). Since the monostable multivibrator of FIG. 5 triggers on the positive slope of the speed sensor output signal, it was necessary in the speed sensor of FIG. 5 to half wave rectify the induced current pulses to eliminate the first positive slope in the positive half cycle. The speed sensor of FIG. 7 has been modified to generate an amplified replica of the induced current pulse which has only one positive slope.

The transistor 53' is connected in a common base configuration and is biased to function as a linear amplifier with approximately three volts at its collector with no signal at its emitter. The capacitor 61' charges through the resistors 57' and 58' to provide a base bias voltage to turn on the transistor 53'. Current will flow from the power input line 56', through the resistor 57', through the transistor 53' and through the parallel connected coil 52' and resistor 55' to the ground line 54'. When the negative half cycle of the current pulse of the waveform A of FIG. 8 occurs, the emitter voltage will be reduced to drive the transistor 53' toward saturation and lower the voltage at its collector. When the positive half cycle of the current pulse occurs, the emitter voltage will be increased to drive the transistor 53' toward cutoff and raise the voltage at its collector. The collector voltage is shown as the waveform B of FIG. 8.

The waveform B of FIG. 8 may be applied to the capacitor 63 of the frequency to voltage converter of FIG. 5. The positive slope of the waveform B will generate a rising voltage at the non-inverting input 67-2 to trigger a change in the output signal of the amplifier 67 from the minimum potential to the maximum potential. The values of the capacitor 72 and the resistor 73 will determine the width of the output pulses. The waveforms C, D and E of FIG. 8 correspond to the waveform C, D and E of FIG. 6.

For each of the three illustrated embodiments of the present invention, there will be a maximum vehicle road speed at which the speed sensor will generate a second output signal before the monostable multivibrator has timed out. At this and greater speeds, the frequency to voltage converter will divide the speed sensor output and therefore the road speed by a factor of two. Although the illustrated embodiments will perform satisfactorily at road speeds in excess of the present speed limits, a retriggerable monostable multivibrator may be utilized to prevent a speed division at excessively high speeds. Retriggerable monostable multivibrators are well-known in the art and will not be illustrated here. At speeds in excess of the previously mentioned maximum speed, the retriggerable multivibrator will trigger before it has timed out to generate a one hundred per cent duty cycle output signal representative of the maximum speed. An associated speed control circuit will then control at this maximum speed rather than suddenly attempt to control at one half of the maximum speed.

In summary, the speed sensors of FIGS. 5 and 7 include a low input impedance preamplifier for generating a pulsed signal having a frequency proportional to the vehicle road speed to a frequency to voltage converter. The frequency to voltage converter includes a monostable multivibrator for generating a pulsed output signal having a constant pulse width with a duty cycle, and therefore, an average magnitude, proportional to the vehicle road speed.

Figure 9:
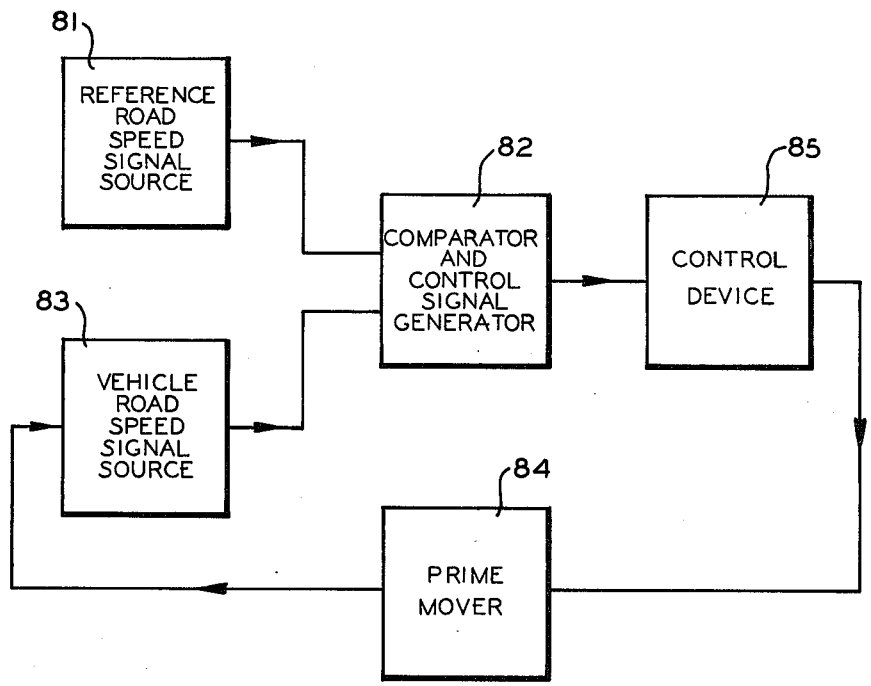
FIG. 9 is a block diagram of the speed control system utilizing the present invention.

Referring to FIG. 9, there is shown a block diagram of a vehicle speed control system utilizing a vehicle road speed signal source according to the present invention. The desired road speed is generated by a reference road speed signal souce 81 as one input signal to a comparator and control generator 82. The reference road speed is a direct current voltage having a magnitude proportional to the desired road speed. A vehicle road speed signal source 83, according to the present invention, senses the rotational velocity of a rotating element associated with a prime mover 84 of the vehicle, such as a drive shaft, to generate a pulsed output signal. The pulsed output signal has a frequency and an average magnitude proportional to the road speed of the vehicle and is the other input to the comparator and control signal generator 82.

The comparator and control signal generator 82 converts the vehicle road speed signal to a direct current voltage having an amplitude proportional to the vehicle road speed and scaled to be equal in amplitude to the reference road speed signal for the same value of road speed. The comparator and control signal generator 82 compares the reference road speed signal with the vehicle road speed signal to obtain an error signal when they are not equal. The comparator and control signal generator 82 then generates a control signal to a control device 85 directing the control device to adjust the speed of the prime mover 84 so as to reduce the error signal to zero. The circuit of FIG. 9 therefore represents a closed loop control system for maintaining a uniform vehicle road speed. The reference road speed signal source 81 and the comparator and control signal generator 82 may be of the type disclosed in the previously referenced U.S. Pat. No. 3,952,829.

In summary, the present invention is shown in its preferred embodiment as a speed sensor including a permanent magnet 11 attached to the drive shaft 12 of a vehicle for inducing current pulses in a proximately spaced coil 17. The current pulses are shaped and amplified by a low input impedance preamplifier to form a pulsed output signal having a frequency proportional to the road speed of the vehicle. The magnet 11 is formed from a samarium-cobalt alloy having a high energy product which allows the use of a relatively small magnet for a given intensity so as not to unbalance the drive shaft 12. The field intensity is high enough that the coil 17 may be located so as not to interfere with any movements of the drive shaft 12. The pulsed speed sensor output signal is the input to a frequency to voltage converter which generates a pulsed output signal having a duty cycle and therefore an average magnitude proportional to the vehicle road speed. Although the present invention has been described in terms of a vehicle road speed signal source, it may be utilized wherever an accurate count of an event is required under conditions which dictate a relatively wide spacing between the magnet and the coil and a relatively high tolerance on that spacing.

In accordance with the provisions of the patent statutes, we have explained the principle and mode of operation of our invention and have illustrated and described what we now consider to represent its best embodiment. However, we desire to have it understood that the invention may be practiced otherwise than as specifically illustrated and described without departing from its spirit or scope.

What we claim is:

1. An apparatus for generating a pulsed output signal representing the road speed of a vehicle, comprising
   high energy product magnetic means attached to a member of the vehicle rotating at a rate proportional to the road speed of the vehicle and movable relative to another member of the vehicle;
   electromagnetically responsive means for sensing each rotation of said magnetic means and generating a current pulse in response thereto, said sensing means being mounted on said another member of the vehicle and spaced from the path of travel of said magnetic means to allow for relative displacement of said rotating vehicle member with respect to the mounting position of said sensing means; and
   low input impedance means responsive to said current pulse for generating said pulsed output signal whereby spurious signals are suppressed from said pulsed output signal.

2. An apparatus according to claim 1 wherein said vehicle member is a drive shaft.

3. An apparatus according to claim 1 wherein said magnetic means is a relatively high energy product permanent magnet.

4. An apparatus according to claim 1 wherein said sensing means is a coil normally spaced approximately 2 inches from the path of travel of said magnetic means to allow for relative displacement of said vehicle member with respect to said coil and said magnetic means generates a magnetic field for inducing said current pulse in said coil when said magnetic means traverses the portion of said path closest said coil.

5. An apparatus according to claim 4 wherein said low input impedance means includes a low input impedance preamplifier means for amplifying at least a portion of said current pulse and a frequency to voltage converter responsive to said amplified current pulse portion for generating said pulsed output signal.

6. An apparatus according to claim 5 wherein said frequency to voltage converter includes a monostable multivibrator for generating said pulsed output signal with a constant pulse width.

7. An apparatus according to claim 1 wherein said means for generating a pulsed output signal includes a low input impedance preamplifier means for amplifying at least a portion of said current pulse and a frequency to voltage converter responsive to said amplified current pulse portion for generating said pulsed output signal.

8. An apparatus according to claim 7 wherein said preamplifier means includes a transistor connected in a common base configuration having an emitter connected for receiving said current pulse and a collector, at which said amplified current pulse portion is generated, connected to said frequency to voltage converter.

9. An apparatus according to claim 7 wherein said frequency to voltage converter includes a monostable multivibrator for generating said pulsed output signal with a constant pulse width.

* * * * *